US008278495B1

(12) United States Patent
Waysbort et al.

(10) Patent No.: US 8,278,495 B1
(45) Date of Patent: Oct. 2, 2012

(54) SYSTEM FOR DECONTAMINATION OF CHEMICAL WEAPONS AGENTS USING SOLID SORBENT WITH LIQUID DECONTAMINATION SOLUTION

(75) Inventors: Daniel Waysbort, Ramat Gan (IL); William R. Creasy, Havre de Grace, MD (US); H. Dupont Durst, Bel Air, MD (US); David J. McGarvey, Columbia, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1278 days.

(21) Appl. No.: 12/024,629

(22) Filed: Feb. 1, 2008

(51) Int. Cl.
*A62D 3/00* (2007.01)
*B09B 1/00* (2006.01)
*B09B 3/00* (2006.01)
*C21B 3/06* (2006.01)

(52) U.S. Cl. ..... 588/299; 588/401; 588/403; 588/249.5; 588/251; 588/255

(58) Field of Classification Search .................. 588/299, 588/300, 401, 403, 249.5, 251, 252, 255
See application file for complete search history.

(56) References Cited

U.S. PATENT DOCUMENTS 6,723,891 B1 * 4/2004 Wagner et al. ................ 588/316
7,276,468 B1 * 10/2007 Tucker .......................... 510/110

OTHER PUBLICATIONS

Cabosil MSDS vBulletin Solutions, 2012, pp. 1-3.*

* cited by examiner

*Primary Examiner* — Colleen Dunn
*Assistant Examiner* — Jennifer Smith
(74) *Attorney, Agent, or Firm* — Ulysses John Biffoni

(57) ABSTRACT

A chemical warfare (CW) agent decontamination system and method for decontaminated surfaces contaminated by CW agents. The system includes both solid particles and liquid solution in admixture such that the solid particles absorb the liquid decontamination material. The method of decontaminating surfaces contaminated with CW agents includes contacting the CW agent with a sufficient amount of a solid-particle sorbent for a sufficient time and under conditions which are sufficient to produce a reaction product having less toxicity than the CW agent. CW agents to be decontaminated include the nerve agents VX and G-type agents, and mustard agent HD. The system is non-toxic and has a reduced environmental impact as compared to the previously available decontamination systems and solutions.

9 Claims, 3 Drawing Sheets

Figure 1:
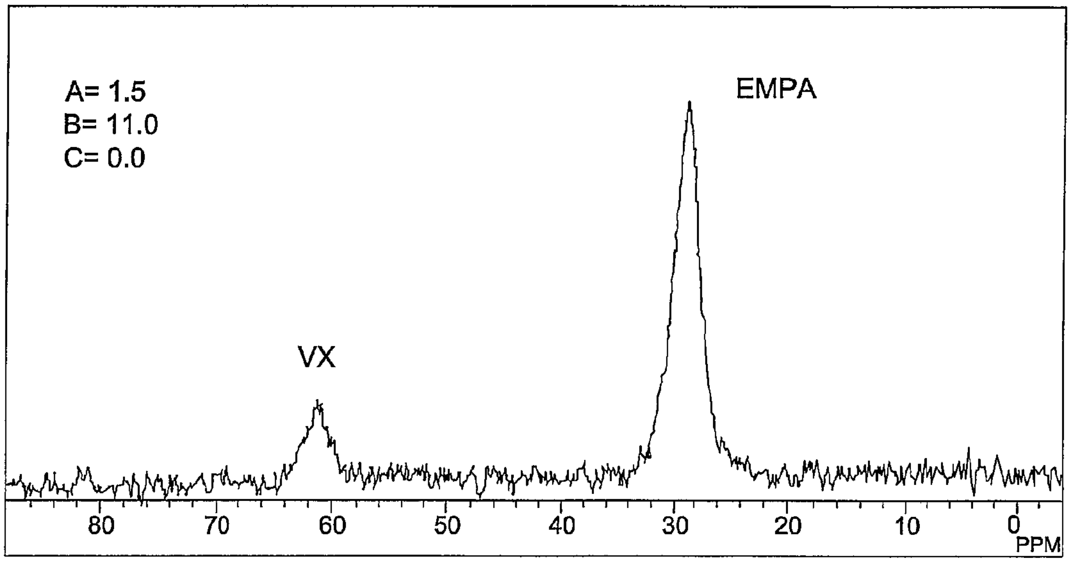

SYSTEM FOR DECONTAMINATION OF CHEMICAL WEAPONS AGENTS USING SOLID SORBENT WITH LIQUID DECONTAMINATION SOLUTION

GOVERNMENT INTEREST

The invention described herein may be manufactured, licensed, and used by or for the U.S. Government.

BACKGROUND OF THE INVENTION

1. Field of the Invention

The present invention includes a chemical weapons (CW) agent decontaminating system comprising absorptive particles and a solution that will effectively degrade chemical warfare agents. The solution can be any decontamination solution that is compatible with the absorptive particles.

The decontamination system described in detail in this invention is an environmentally safe decontamination system for CW agents, such as nerve agents (G and V-type agents) and mustard agent (HD). The decontamination system can be applied to a surface which is contaminated by a CW agent.

2. Brief Description of the Related Art

Chemical weapons are a possible threat if used by terrorists or military organizations against civilian populations or military targets. In the event of such an attack, it will be necessary to have an environmentally safe chemical system to clean up the affected area by decontaminating CW agents into less hazardous chemicals.

Several types of toxic chemical compounds are known. These include mustard (HD) and nerve agents. Mustard agents or gases, also called blister agents, may be nitrogen or chlorinated sulfur compounds. The most common type of mustard agents are the chlorinated sulfur compounds. Long after mustard gas was discovered in 1822, it was used in World War I as a CW agent, causing approximately 400,000 casualties. The sulfur mustard gas is chemical known as bis-(chloroethyl)-sulphide. The nitrogen mustard gas is chemically known as tris(2-chloroethyl)-amine. Mustard gas is a colorless, oily liquid having a garlic or horse-radish odor. It is slightly soluble in water, complicating removal by washing. It primarily attacks humans through inhalation and dermal contact, having an Airborne Exposure Limit (AEL) of 0.003 $mg/m^3$. Mustard gas is a vesicant and a alkylating agent which produces a cytotoxic reaction to the hematopoietic tissues. Symptoms usually take effect 4 to 24 hours after initial contact. The rate of detoxification of mustard gas is slow and repeated exposure yields a cumulative effect.

Nerve agents or gases were discovered in 1936, during research on more effective pesticides. Nerve agents inhibit a certain enzyme within the human body from destroying a substance called acetylcholine. This produces a nerve signal within the body forcing the muscles to contract. Nerve agents have an Airborne Exposure Limit (AEL) of 0.00001 $mg/m^3$.

Currently, one of the primary chemical warfare agent decontaminating solutions is Decontamination Solution 2. Decontamination Solution 2, or DS2, is a chemical warfare decontaminating solution used by the United States Army. DS2 contains approximately 70% diethylenetriamine (DETA), 28% ethylene glycol monomethyl ether (EGME), and 2% NaOH by weight, and is used for decontaminating a variety of chemical warfare agents. However, DS2 is toxic, corrosive, flammable and hazardous to the environment. EGME is teratogenic, and the secondary amine structure in DETA possesses a possible health hazard from conversion to a potential N-nitrosoamine carcinogen. In addition, DS2 is extremely resistant to biodegradation, particularly with regard to the DETA component of the solution.

Another common chemical decontamination system is STB/HTB slurry. As with DS2 this chemical decontamination system is hazardous to the environment, very corrosive, and can destroy or damage most materials, including plastic and rubber materials, various metals, and delicate electronic equipment. Also, handling these decontamination solutions requires protective gear which results in a cumbersome operation. With STB, the clean up after the application has to be done either by mechanically removing the upper layer of the contaminated surface or by use of concentrated acids to dissolve this layer.

In the last two decades, efforts have been made to formulate new decontamination systems to replace these current decontamination means. To overcome the problems, liquid decontamination systems based on hydrogen peroxide solutions were developed that have the potential to be effective at decontaminating chemical warfare (CW) materials, as well as having a reduced environmental impact compared to previously available systems. The hydrogen peroxide based decontamination solution is described in U.S. Pat. No. 6,245,958, the entire disclosure of which is herein incorporated by reference. The hydrogen peroxide decontamination solution has a broad-spectrum reactivity toward CW agents, while achieving a significant reduction in the toxic, corrosive and environmentally harmful nature of the decontaminant. However, as a liquid the application of the hydrogen peroxide decontamination solution to a surface is problematic because it flows, does not form a surface barrier, and contact time with the contaminated surface is sometimes not sufficient to decontaminate the surface.

Sorbents can be used to absorb CW agent contamination. Examples of these sorbents are described in U.S. Pat. Nos. 5,689,038 and 6,852,903, the entire disclosure of which is herein incorporated by reference.

Usually, the absorption process is fast and the agent is held inside the sorbents, thus reducing its hazard by decreasing its vapor pressure. Use of these sorbents thus makes decontamination methods possible. For example, one method of decontaminating a surface that is believed to include a toxic agent involves coating the contaminated surface with a reactive sorbent, and to decontaminate the absorbed contaminant. The main disadvantage of this approach is that the contaminated sorbent particles have to be decontaminated. The sorbent materials have large surface areas, are very porous, and may be light enough to be airborne, with the result that the hazard can be spread instead of being confined.

Thus, there still exists a need for a decontamination system wherein the decontaminating agent is non-toxic, non-corrosive, non-flammable can be biodegraded or otherwise less hazardous to the environment then current decontamination systems.

SUMMARY OF THE INVENTION

It is therefore an object of the invention to provide a decontamination system and method of use that will effectively degrade chemical warfare agents.

It is a further object of the invention to provide a decontamination solution that is compatible with an absorptive particle which is environmentally safe, is non-corrosive, non-toxic, non-flammable and having a reduced environmental impact compared to previously available systems.

There is a further object of the invention to provide a method for decontaminating surfaces which have been contaminated by CW agents, especially nerve agents and mustard (HD).

It is a further object of the invention to apply a decontamination system to a surface which has been contaminated by a chemical warfare agent by providing a system comprised of sorbents having the ability to decontaminate the absorbed CW agent.

It is a still further object to the invention to provide a system of solid particles mixed with a solution capable of decontaminating the agents, so the solution is absorbed in the particles. The sorbent is dispersed as a suspension or slurry in the liquid, and applied to a contaminated surface.

The invention further includes a process of detoxifying chemical warfare agents by contacting a chemical warfare agent with a sufficient amount of a sorbent for a sufficient time and under conditions which are sufficient to produce a reaction product having less toxicity than the chemical warfare agent. These and other objects of the invention will be more fully understood by reference to the accompanying figures and detailed description of the preferred embodiments.

DETAILED DESCRIPTION OF THE DRAWINGS

FIG. 1—NMR spectrum at 8 min. after mixing showing VX and EMPA Peaks, using a 4 min. run time (64 scans).

Figure 2:
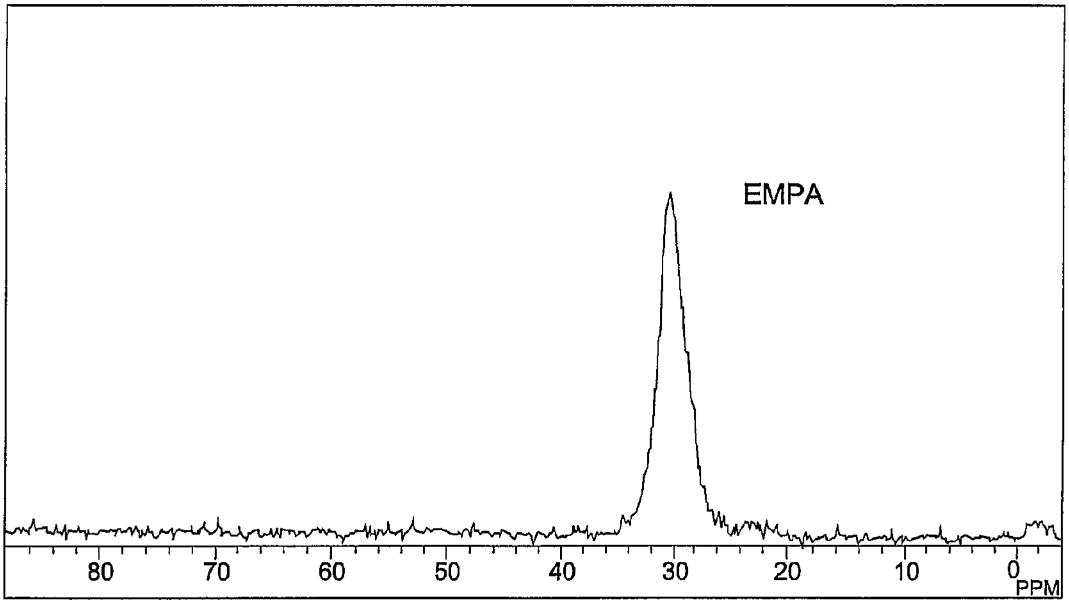

FIG. 2—NMR at 44 min. after mixing showing predominant EMPA peak.

Figure 3:
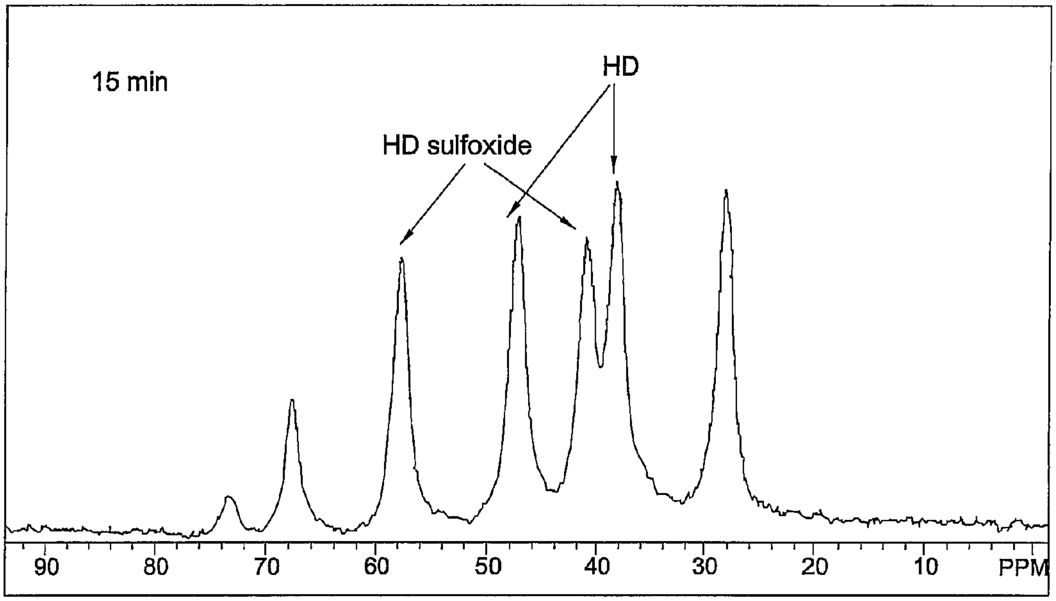

FIG. 3—NMR spectrum at 15 min. after mixing showing major HD peaks.

Figure 4:
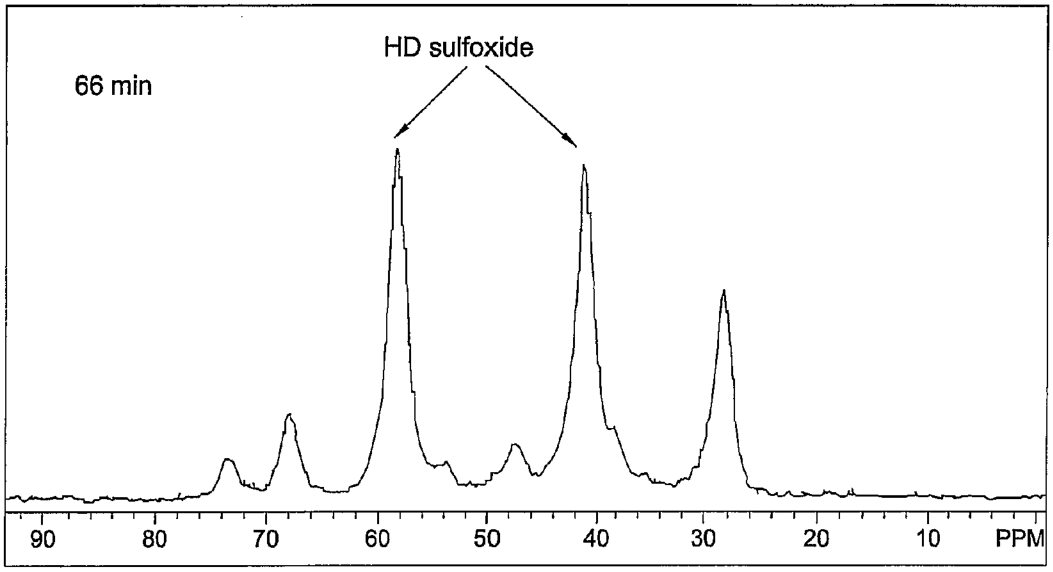

FIG. 4—NMR spectrum at 66 min. after mixing, showing predominant HD sulfoxide peaks.

Figure 5:
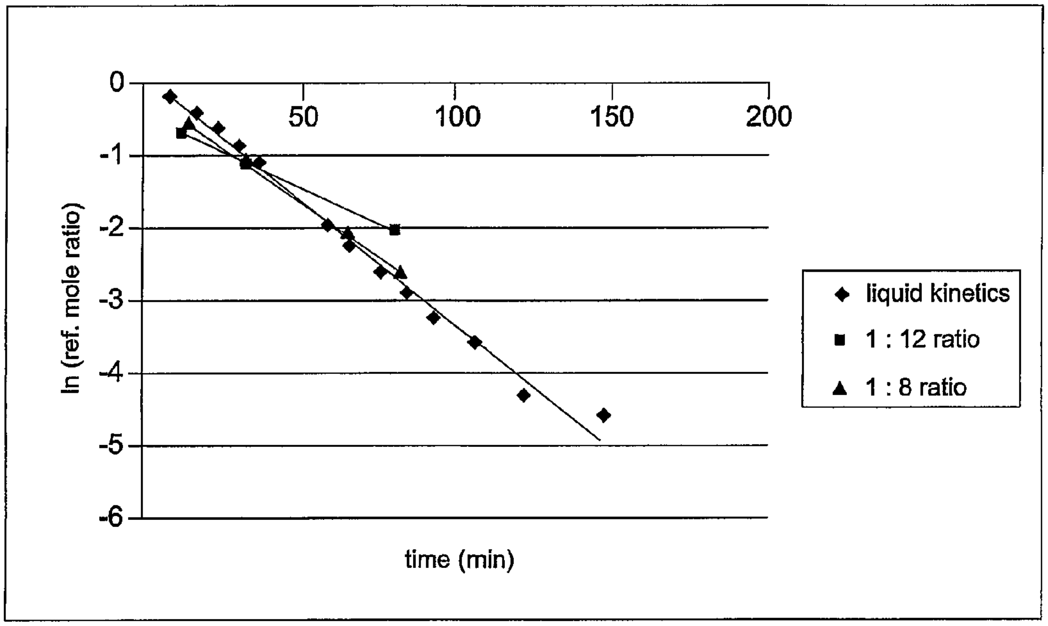

FIG. 5—Kinetic plot of the rate of reaction of HD in a 1:50 ratio of agent to (solid+liquid) decontamination system. The weight ratio of solid to decontamination solution in the decontamination system was 1:8 and 1:12 as plotted on the figure. A comparison was done to the rate for liquid decontaminant alone.

DETAILED DESCRIPTION OF THE PREFERRED EMBODIMENTS

In one embodiment the invention is directed to a decontamination system comprising absorptive solid material and a decontamination solution. The system comprises an absorptive solid material having a decontamination solution contained therein. More particularly, the system comprises a particulate sorbent having the ability to decontaminate the absorbed agent and is an ideal solution to the problem of decontaminating surfaces contaminated by CW agents.

The system can be most easily achieved by mixing the solid particles with a solution capable of decontaminating the agents, so that the solution is absorbed into the particles. The sorbent is dispersed as a suspension or slurry in the liquid. A commercially effective sorbent and a decontamination solution are chosen such that the liquid will be absorbed by the particles, will be compatible with them, and will not lose its decontamination activity toward the CW agents.

The method achieves the detoxification of chemical warfare agents by contacting a chemical warfare agent with a sufficient amount of a sorbent for a sufficient time and under conditions which are sufficient to produce a reaction product having less toxicity than the chemical warfare agent.

In a most preferred embodiment, once the decontamination system is formulated and applied, this combination should be effective as a physical barrier, in addition to its chemical reactivity. Being a physical barrier is a result of the large absorptive capacity and the physical existence of the particles which block the volatilization of the CW agents from the contaminated surface.

In a particularly preferred embodiment, the solid part of the decontamination system may be any absorbent solid material that is not incompatible with the decontamination solution chosen for use. The following solid material showed high performance, and is given as an example without limiting the potential solid materials that can be used in the invention.

Applicants have found that POLYTRAP® 6603 Adsorber, a lauryl methacrylate/glycol dimethacrylate crosspolymer (CAS# 61181-29-1, herein incorporated by reference) to be an appropriate solid for the specific composition of decontamination solution used in the following example.

This material is a very fine white powder, having particle sizes of less than 1 micron, with agglomerates of 20 to 80 microns. It absorbs up to 12 times its weight of the decontaminating liquid, and still remains highly absorbent when spiked with the chemical warfare material. It shows only slow reactivity with the decontamination solution.

The best results were obtained in the solid-liquid system using the solution composed of potassium carbonate and bicarbonate, hydrogen peroxide and alcohol. Baking soda and hydrogen peroxide, when dilute, possess non-irritating characteristics. When formulated with various human-compatible alcohols, e.g., ethanol (grain alcohol), isopropanol (rubbing alcohol) and polypropylene glycol (food additive), the composition remains non-irritating and non-toxic.

The following description is an example of the decontamination system that was developed utilizing the foregoing approach. It is to be expressly understood that such description is only exemplary and not limiting.

For example, it is possible to have various effective agent-to-decontamination ratios depending on the CW agent to be decontaminated. Examples of these are 1:30 for agent VX, 1:50 for agent HD, and 1:50 for agent GD. When the system includes molybdate, ratios about 1:10 for agent HD are efficient. An additional advantage appears when a color change indicates when the reagent on the particles has been consumed. However, such is not a requirement for the system to be effective in decontaminating CW agents.

VX REACTIONS

Chemical warfare agent VX with the decontamination system showed rapid conversion (less than 1 hour) to much less hazardous material, such as ethyl methylphosphonic acid (EMPA). Commonly observed and highly toxic VX breakdown product EA-2192(S-(2-diisopropylaminoethyl) methylphosphonothioic acid) was not detected. The fate of VX in the decontamination system is shown in FIGS. 1 and 2 with FIG. 1 showing a 4 min. run-time and FIG. 2 showing a 44 min. run-time after mixing with the decontamination system.

MUSTARD (HD) REACTIONS

Reaction of chemical warfare agent HD with the decontamination system (1:50 ratio) showed rapid conversion (8 min.) to a much less hazardous materials such as HD sulfoxide. At a ratio of 1:10, the reaction was complete in about 1 hour. Results from the NMR spectra are shown in FIGS. 3 and 4 with FIG. 3 showing the NMR spectrum at 15 min. and FIG. 4 showing the NMR spectrum at 66 min. after mixing.

FIG. 5 shows kinetic plots comparing the reaction of HD in a liquid solution and with the liquid/solid slurry with ratios of solid:liquid of 1:8 and 1:12, by weight. When molybdate was added, the reaction was too fast to measure. A comparison plot was done to show the rate for a purely liquid decontamination solution.

SOMAN GD REACTIONS

Reactions at 1:50 ratio of chemical warfare agent GD with the decontamination system showed rapid conversion (less than 8 min.) to much less hazardous materials, primarily pinacolyl methylphosphonic acid.

The following Table shows in summary, the CW agent is undetectable by the method (>90% destroyed) after the given times:

| CW Agent | Ratio, agent to decontamination | Time to >90% |
|---|---|---|
| VX | 1:30 | 30 min. |
| GD | 1:50 | 8 min. |
| HD | 1:50 | 8 min. |
| | 1:10 | 1 hour |

BEST MODE KNOWN TO THE INVENTORS

A decontamination solution was prepared by dissolving 5.8 mg of solid, $K_2MoO_4$, in 1.16 ml of the following solution: 1.5 ml of isopropanol, 1.18 ml of 50% $H_2O_2$ solution, 0.5 ml of $KHCO_3/K_2CO_3$ solution, 0.2 ml Triton X100, 0.04 ml 5 N NaOH solution and 64.5 mg of solid $K_2CO_3$. $KHCO_3/K_2CO_3$ solution was made from 80.9 mg of $K_2CO_3$ and 28.5 mg of $KHCO_3$ dissolved in 1 ml of distilled water.

0.836 g of the decontamination solution was added to 91.0 mg of the solid. The mixture-slurry was mechanically mixed for homogeneity. 20 μL of VX was added, spiked with a syringe into the mixture. The slurry was packed into a 4 mm glass NMR tube which was flame-sealed, then placed in a 5 mm glass NMR tube, which is also flame-sealed. This was done for operator safety reasons, since some pressure buildup was caused by the reaction of the hydrogen peroxide. When used as a method of decontaminating surfaces contaminated by CW agents the sorbent is dispersed as a slurry or suspension and then is contacted with the CW agent with a sufficient amount of sorbent for sufficient time and are under conditions of which are sufficient to produce a reaction product having less toxicity than the chemical warfare agent.

In a particularly preferred embodiment the system should be effective as a physical barrier, in addition to its chemical reactivity. Being a physical barrier is a result of the large absorption capacity and the physical existence of the particles which block the volatilization of the CW agents from the contaminated surface. The physical barrier may be applied as a layer of solid particles having the liquid decontamination absorbed therein or may be applied as a slurry or suspension.

Thus, we have described a more environmentally safe decontamination system and method than traditional methods based on chlorine bleach or concentrated caustic solutions. This decontamination system also simplifies procedures for storage, handling, and transportation of decontamination material, and also potentially avoiding the bulky protective clothing required to apply and remove previous decontamination materials. Furthermore, the decontamination system does not have the drawbacks of the STB system where clean up after the application has to be done either by mechanically removing the upper layer of the contaminated surface or by use of concentrated acid to dissolve the layer formed by use of the STB decontamination system.

The system according to the present invention can be applied as a solid, suspension or slurry like physical state having an advantage over liquid decontamination solutions and applications where providing a physical barrier over contaminated surfaces is desirable, or in locations where run-off of a liquid from a decontamination operation may present a hazard to people or the environment. As noted above, there is wide range of ratios of the chemical agents to the decontamination system which are still effective to decontaminate surfaces contaminated by CW agents.

It should be understood that the foregoing summary, detailed description, and examples of the invention are not intended to be limiting, but are only exemplary of the inventive features which are defined in the following claims.

We claim:

1. A system for decontamination of chemical weapons agents, comprising:

a plurality of solid particles; at least some of the solid particles being capable of absorbing the chemical weapons agents; wherein the solid particles comprises a lauryl methacrylate/glycol dimethacrylate copolymer and said solid particles having absorbed therein a liquid decontamination solution.

2. The system of claim 1, wherein the liquid decontamination solution comprises hydrogen peroxide, potassium carbonate and potassium bicarbonate.

3. The system of claim 1, wherein the liquid decontamination solution is present in a sufficient amount to suspend the solid particles in the liquid decontamination solution.

4. The system of claim 1, wherein the solid particles have a particle size of less than 1 micron.

5. The system of claim 1, wherein the solid particles can absorb up to 12 times their weight of the decontamination liquid.

6. The system of claim 1, wherein the chemical weapons agents comprise at least one agent selected from the group consisting of GD, VX and HD chemical warfare agents.

7. The system of claim 1, wherein the liquid to solid particle ratio is sufficient to form a slurry.

8. The system of claim 1, further comprising a molybdate.

9. The system of claim 2, wherein the liquid decontamination solution further comprises an alcohol.

* * * * *